March 10, 1936.    F. W. LUTHER    2,033,346
BRUSH GATHERER
Filed Dec. 17, 1934
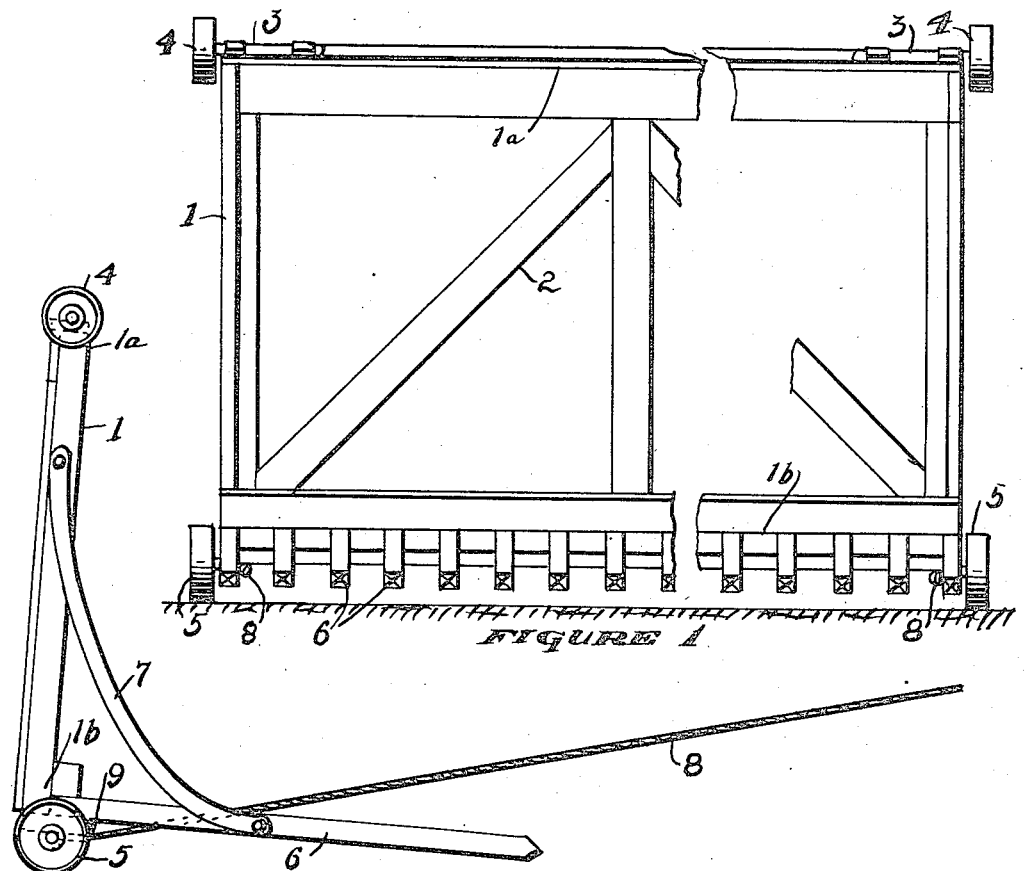
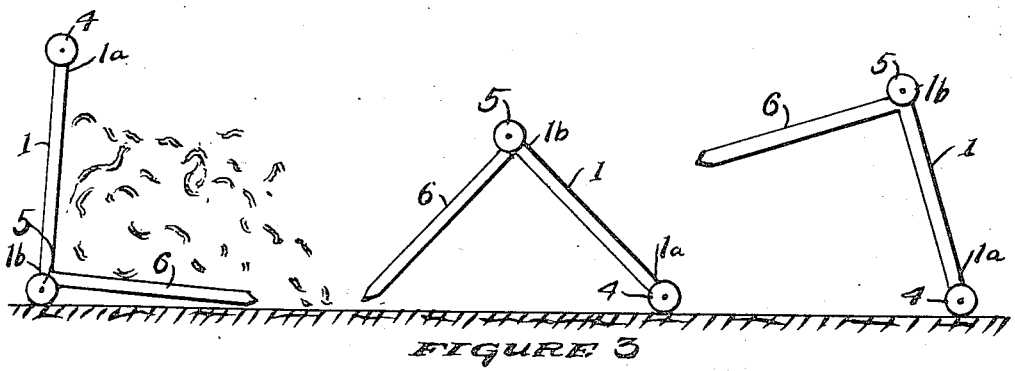
INVENTOR
Frank W. Luther
John A. Naismith
ATTORNEY Patented Mar. 10, 1936

2,033,346

UNITED STATES PATENT OFFICE 2,033,346

BRUSH GATHERER

Frank W. Luther, San Jose, Calif.

Application December 17, 1934, Serial No. 757,858

1 Claims. (Cl. 214—1)

In pruning the many trees of a large orchard a great mass of dead wood accumulates upon the ground. This wood is ordinarily disposed of in different ways, usually by gathering it up and loading it upon trucks and in this manner completely removing it from the orchard to a selected place for burning, or gathering it into small piles and burning it between the trees in the orchard. The methods heretofore practiced are exceedingly wasteful of time and labor because they involve the use of the ordinary manually operated fork in gathering the material together and depositing it in a heap for burning or on a truck for removal to a more suitable place for burning.

Burning the brush in the orchard is objectionable because it can only be burned in small heaps, and these are so loose and open that they require a great deal of attention to effect their complete destruction. If the brush is hauled out of the orchard on trucks it must be burned in excessively large heaps because a single truck load or two burn out before a new load can be added to it.

It is, therefore, the object of the present invention to provide means whereby the brush may be completely removed from the orchard with a minimum amount of manual labor and with sufficient speed to enable the burning process to be carried on continuously.

It is another object of the invention to provide a means of the character indicated that will be simple in form and construction, economical to manufacture, and operate, strong, durable, and highly efficient in its practical application.

In the drawing:

Figure 1 is a front elevation of a device embodying my invention, a part being broken away.

Figure 2 is a side elevation of the same.

Figure 3 is a diagrammatical illustration showing the method of operation of the device when gathering brush.

In the particular embodiment of the invention as herein disclosed I show at 1 a rectangular wooden frame properly braced as at 2, the upper edge of the frame being indicated at 1a and the lower edge at 1b.

Mounted on each end of the upper edge 1a is a shaft as 3, each shaft carrying a wheel as 4.

The lower edge 1b of the frame has wheels as 5 mounted thereon as shown, this edge also having tines as 6 mounted thereon and projecting laterally therefrom at substantially right angles thereto.

The frame 1 and the set of tines 6 may be braced in any suitable manner as indicated at 7, and cables as 8 are attached to either end thereof as indicated at 9 whereby the device may be drawn over the ground by a truck or tractor or any available vehicle.

While the device may be drawn forwardly while in the position shown at A in Figure 3 for the gathering of such brush as may lie in its path, it is at the same time under the manual control of one of the operators. When the device is collecting the brush it is moving on the wheels 5, but when a load has been collected and carried to the point where it is to be burned then the operator tips the frame 1 forwardly so that the tines 6 will engage the ground. The continued pulling of the tractor will now tip the whole device forwardly and over the points of the tines as a center until it takes the position shown at B in Figure 3. In this position the weight of the device is thrown upon the wheels 4 and the continued pulling of the tractor pulls the tined platform 6 upwardly and over the brush as shown at C in Figure 3, the whole device being moved forwardly and away from the brush heap on the wheels 5. The device may now be turned back into its original position when it will again be ready for another load.

The connecting of the cable 8 at or near the angle formed by the frame 1 and tines 6 is important because the device is always well balanced on wheels 5 and may be perfectly and easily controlled by the operator.

It is to be understood, of course, that while I have herein shown and described but one specific embodiment of the invention, changes in form, construction, materials, and method of assembly and operation may be made within the scope of the appended claim.

I claim:

A brush gatherer comprising, a rectangular and rigidly braced frame having tines mounted along one edge only thereof and projecting laterally therefrom at substantially right angles thereto, supporting wheels mounted on the four corners of said frame, and draft means connected to the edge of the frame carrying the tines.

FRANK W. LUTHER.